(12) United States Patent
Kim et al.

(10) Patent No.: US 8,257,630 B2
(45) Date of Patent: Sep. 4, 2012

(54) METHOD FOR FABRICATING 3D STRUCTURE HAVING HYDROPHOBIC SURFACE USING METAL FOIL

(75) Inventors: Dong-Seob Kim, Pohang-si (KR); Kun-Hong Lee, Pohang-si (KR); Woon-Bong Hwang, Pohang-si (KR); Geun-Bae Lim, Pohang-si (KR); Hyun-Chul Park, Pohang-si (KR); Byeong-Joo Lee, Pohang-si (KR); Sang-Min Lee, Seoul (KR); Joon-Won Kim, Pohang-si (KR)

(73) Assignee: Postech Academy-Industry Foundation, Pohang (KR)

( * ) Notice: Subject to any disclaimer, the term of this patent is extended or adjusted under 35 U.S.C. 154(b) by 41 days.

(21) Appl. No.: 12/921,585

(22) PCT Filed: Mar. 12, 2009

(86) PCT No.: PCT/KR2009/001250
§ 371 (c)(1),
(2), (4) Date: Sep. 9, 2010

(87) PCT Pub. No.: WO2009/113822
PCT Pub. Date: Sep. 17, 2009

(65) Prior Publication Data
US 2011/0012285 A1        Jan. 20, 2011

(30) Foreign Application Priority Data
Mar. 14, 2008   (KR) ................. 10-2008-0024028

(51) Int. Cl.
*B29C 39/12* (2006.01)
(52) U.S. Cl. ....................... 264/219; 264/220
(58) Field of Classification Search .................. 264/220, 264/219
See application file for complete search history.

(56) References Cited

U.S. PATENT DOCUMENTS

| 3,884,771 | A | * | 5/1975 | Hanabusa et al. ............... 205/76 |
| 4,482,511 | A | * | 11/1984 | Komatsubara ................. 264/483 |
| 4,619,804 | A | * | 10/1986 | Leonard et al. ................ 264/220 |
| 4,923,572 | A | * | 5/1990 | Watkins et al. ................. 205/69 |
| 2004/0135293 | A1 | * | 7/2004 | Umeki .......................... 264/494 |
| 2006/0270229 | A1 | | 11/2006 | Cordernam et al. | |

FOREIGN PATENT DOCUMENTS

| CN | 1625489 | 6/2005 |
| DE | 10064520 | 7/2002 |
| JP | 10-278277 | 10/1998 |
| JP | H10-287277 | * 10/1998 |
| KR | 10-2008-0004409 | 1/2008 |

OTHER PUBLICATIONS

"Superhydrophobic nanostructures based on porous alumina", Oct. 10, 2007, Current Applied Physics 8 (2008) 770-773; Kim, Hwang, Lee, and Park.* D. Kim et al, Superhydrophobic nanostructures based on porous alumina, Current Applied Physics, North-Holland, vol. 8, No. 6, Oct. 10, 2007, pp. 770-773.

* cited by examiner

*Primary Examiner* — Joseph Del Sole
*Assistant Examiner* — Kimberly A Stewart
(74) *Attorney, Agent, or Firm* — Lexyoume IP Meister, PLLC.

(57) ABSTRACT

A method for fabricating a 3D (three-dimensional) structure such that the 3D structure has a surface with hydrophobicity by using a metal foil such as an aluminum foil is disclosed. The method includes preparing a metal foil base by attaching a metal foil on an outer surface of a predetermined-shaped 3D structure; anodizing the metal foil base; coating a polymer material on the outer surface of the metal foil base material to form a negative replica structure; forming an outer structure by covering an outer surface of the negative replica structure with an outer formation material; and removing the metal foil base.

7 Claims, 6 Drawing Sheets

[Figure 1]
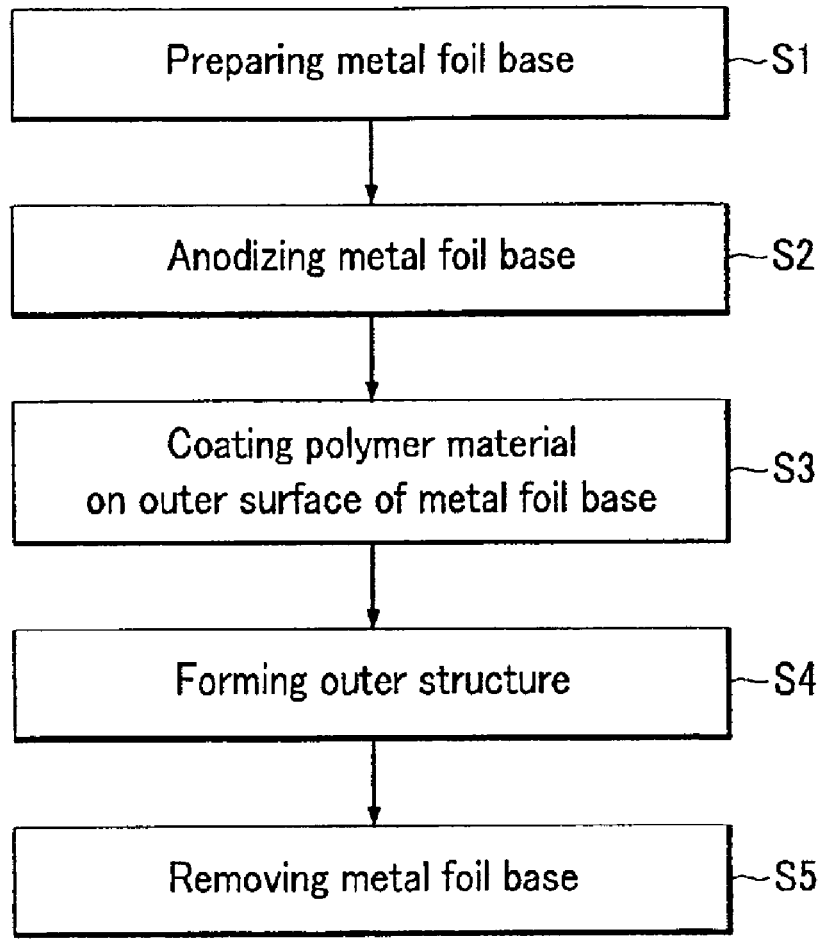
[Figure 2]
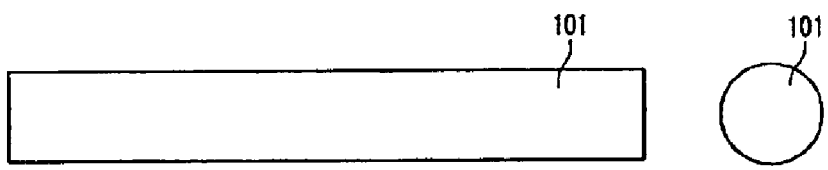
[Figure 3]
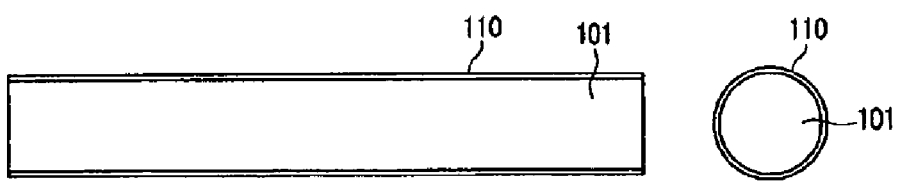

[Figure 4]
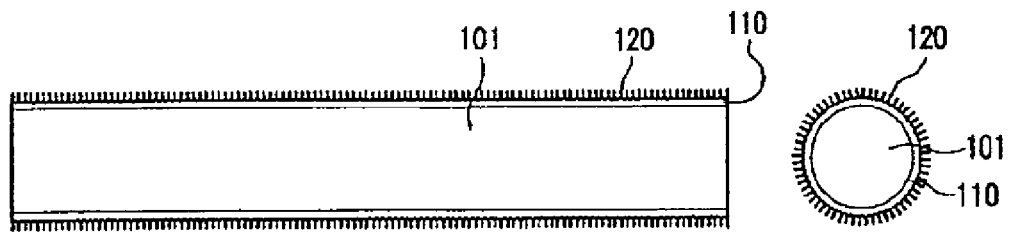
[Figure 5]
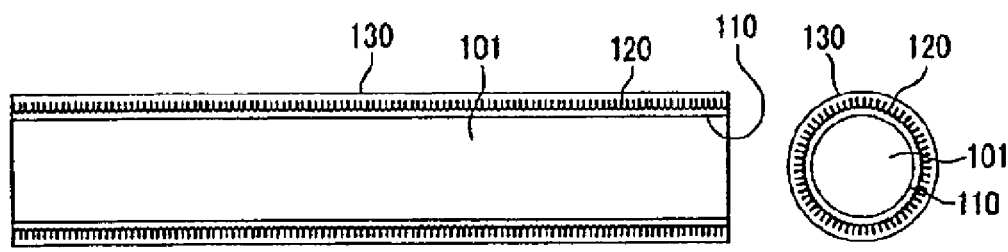
[Figure 6]
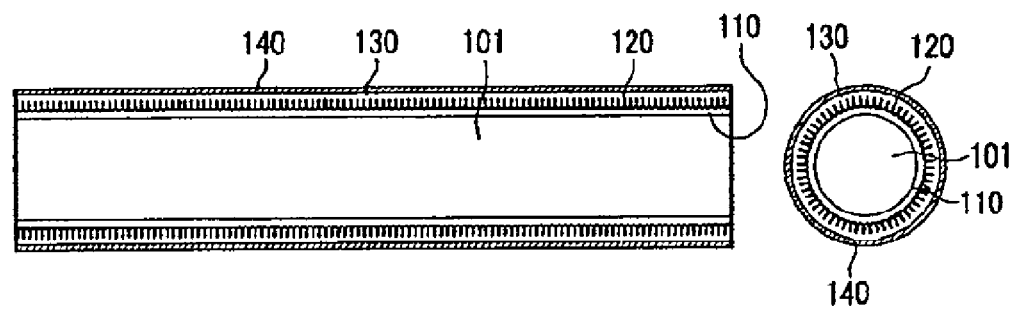
[Figure 7]
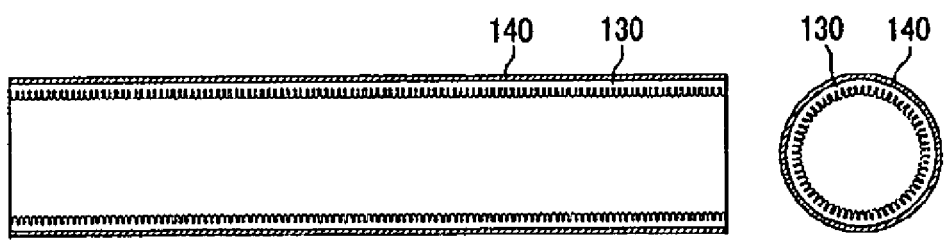

[Figure 8]
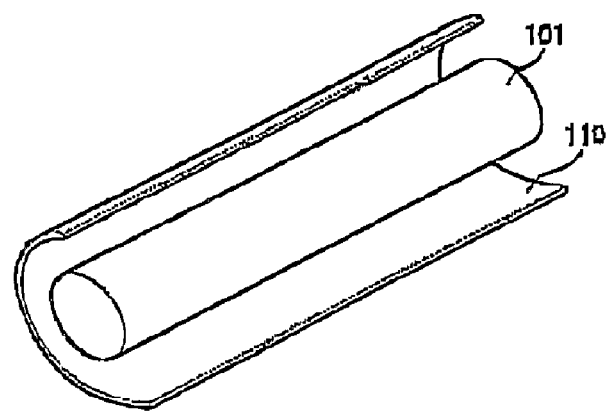
[Figure 9]
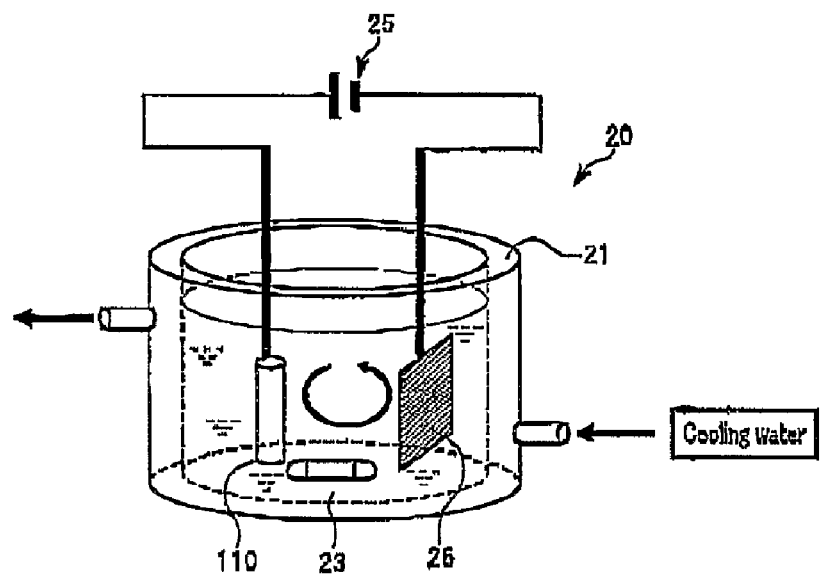
[Figure 10]
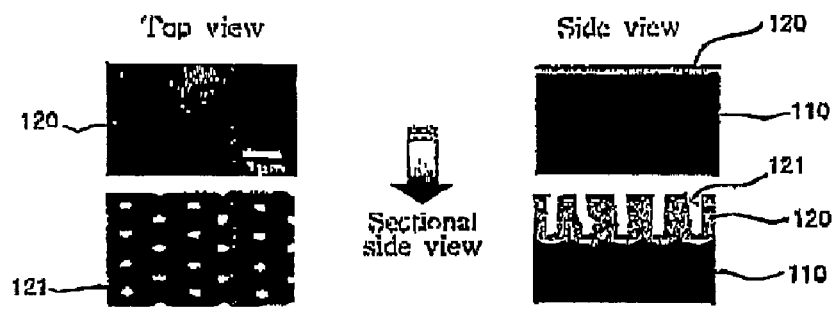

[Figure 11]
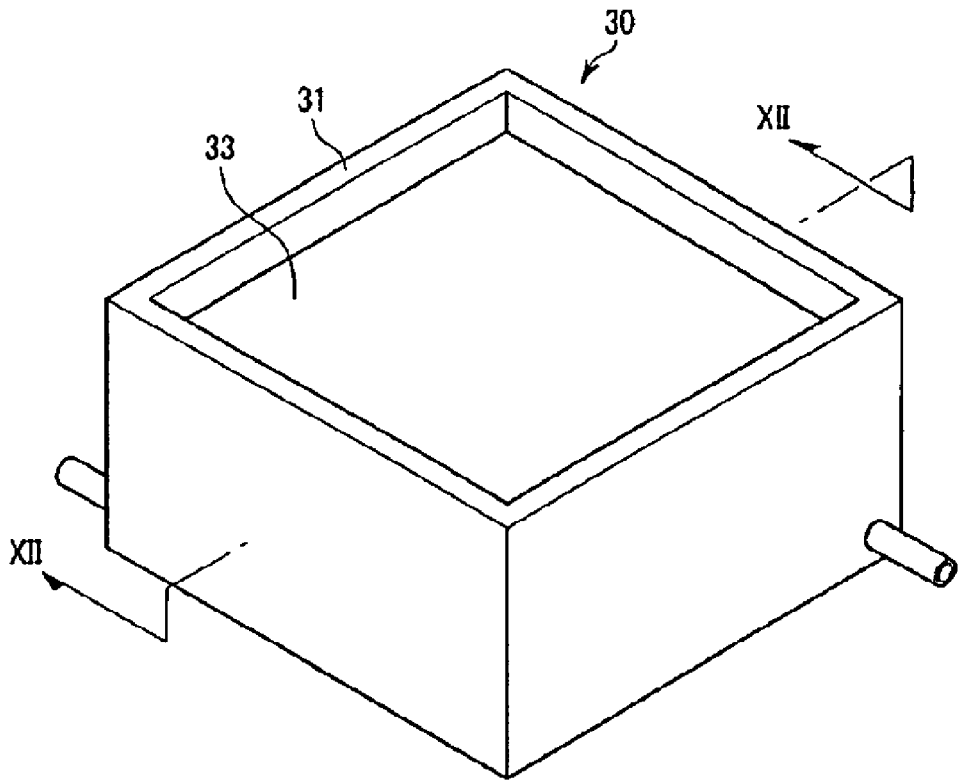
[Figure 12]
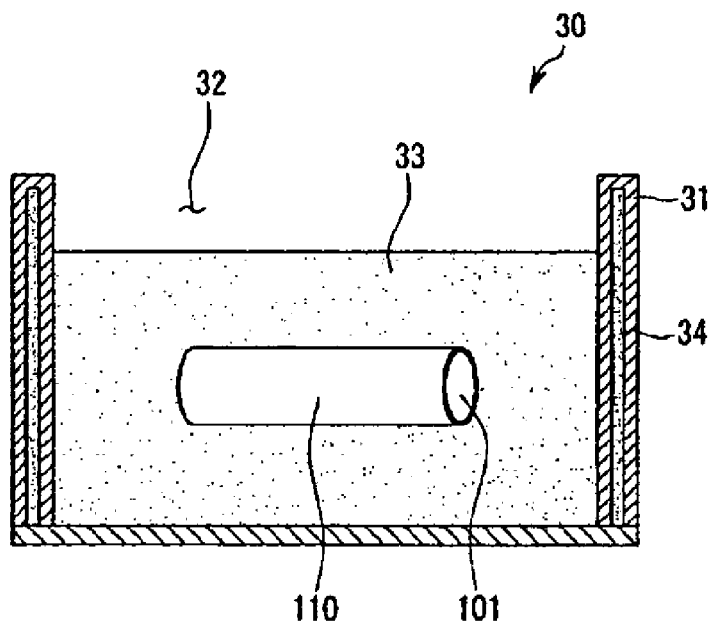

[Figure 13]
(a)
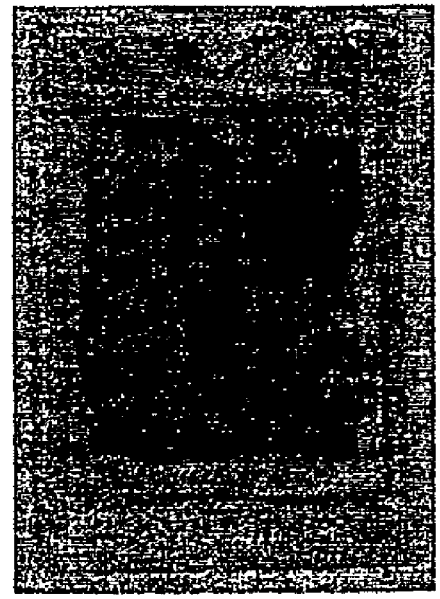
(b)
[Figure 14]
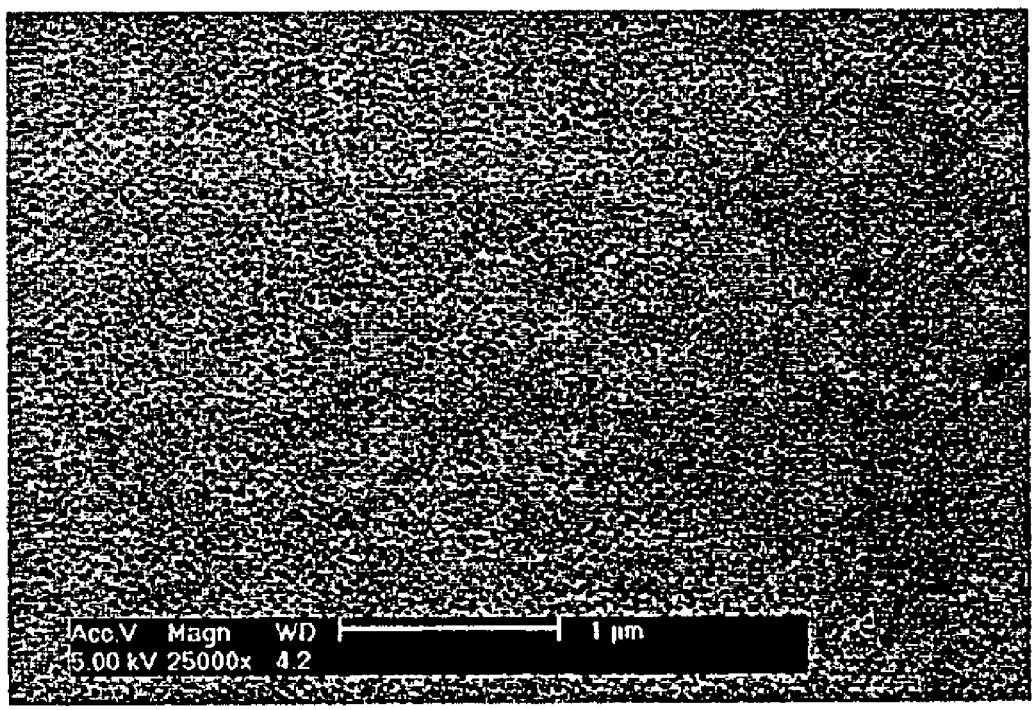

[Figure 15]
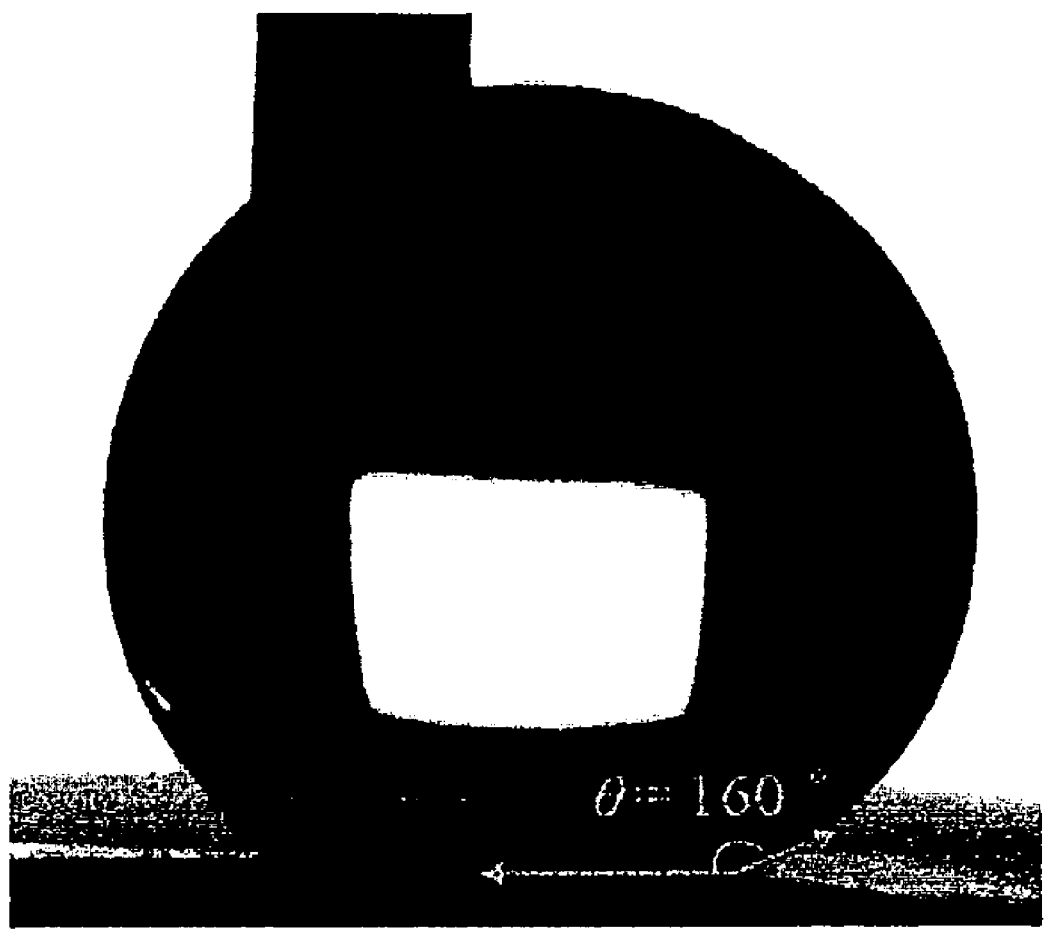

METHOD FOR FABRICATING 3D STRUCTURE HAVING HYDROPHOBIC SURFACE USING METAL FOIL

TECHNICAL FIELD

The present invention relates to a method for fabricating a 3D (three-dimensional) structure (or 3D-shaped structure) having a hydrophobic surface and, more particularly, to a method for fabricating a 3D structure such that the 3D structure has an outer surface with hydrophobicity by using a metal foil such as an aluminum foil.

BACKGROUND ART

In general, the surface of a solid base material such as a metal or polymer has a specific surface energy. The specific surface energy appears as a contact angle between a liquid and a solid when the liquid contacts the solid. Here, the liquid generally refers to water or oil, etc., and water shall be representatively mentioned as the liquid hereinafter. If the contact angle is smaller than 90° a spherical water drop loses its form on the surface of the solid to wet the surface of the solid, exhibiting wettability. If, however, the contact angle is larger than 90° the spherical water drop maintains its form on the surface of the solid to easily flow by an external force rather than wet the surface of the solid, exhibiting non-wettability. For example, if a water drop falls on a lotus leaf, it does not wet the lotus leaf but flows on the surface of the lotus leaf. This phenomenon indicates the non-wettability.

The value of the specific contact angle on the surface of the solid base material may change if the surface is processed to have fine protrusions and depressions (unevenness). Namely, a hydrophilic surface having a contact angle of smaller than 90 can have greater wettability through surface processing, and a hydrophobic surface having a contact angle of larger than 90 can have greater non-wettability through surface processing. The hydrophobic surface of the solid base material may be applicable in various manners. If the hydrophobic surface is applied to a piping structure, flow of liquid in a pipe can be facilitated to increase the quantity of flow and flow velocity. Thus, the application of the hydrophobic surface to a water service pipe or a boiler pipe can considerably reduce accumulation of foreign substances compared with the related art. In addition, if a polymer material is used for the hydrophobic surface, the inner surface of the pipe can be prevented from being corroded, and accordingly, water pollution can be reduced.

However, a technique for changing the contact angle on the surface of the solid for an arbitrary purpose is known, to date, as a MEMS (Micro Electro Mechanical Systems) process to which a semiconductor fabrication technique is applied, whereby the surface of the solid is formed to have fine protrusions and depressions of micro- or nano-scale. The MEMS process is an up-to-date technique employing the semi-conductor technique by mechanical engineering, but the semiconductor process incurs much costs. Namely, in order to form the protrusions and depressions of a nano-scale on the surface of the solid by using the MEMS process, operations such as oxidizing the metal surface, applying certain temperatures and certain voltages, and oxidizing and etching in a special solution are performed. The MEMS process cannot be performed in a general working environment but should be performed in a specially fabricated clean room, and machines required for the operation are high-priced equipment. In addition, the MEMS process is disadvantageous in that it cannot process a large surface at one time.

Thus, because the existing technique for forming the hydrophobic surface has a very complicated process, is not suitable for mass-production, and incurs high fabrication costs, its application is not easy.

The above information disclosed in this Background section is only for enhancement of understanding of the background of the invention and therefore it may contain information that does not form the prior art that is already known in this country to a person of ordinary skill in the art.

DISCLOSURE OF INVENTION

Technical Problem

The present invention has been made in an effort to provide a method for fabricating a 3D (three-dimensional) structure having a hydrophobic surface having advantages of simplifying processes and lowering fabrication costs compared with the related art method.

The present invention also provides a method for fabricating a 3D structure having a hydrophobic surface having advantages of fabricating the 3D structure by using a material such as aluminum foil that can be easily come by in daily life.

Technical Solution

An exemplary embodiment of the present invention provides a method for fabricating a 3D structure, including: preparing a metal foil base by attaching a metal foil on an outer surface of a predetermined-3D structure; anodizing the metal foil base to form nano-scale holes on an outer surface of the metal foil base; coating a polymer material on the outer surface of the metal foil base to form the polymer material as a negative replica structure corresponding to the nano-scale holes of the metal foil base; forming an outer structure by covering an outer surface of the negative replica structure with an outer formation material; and removing the metal foil base from the negative replica structure and the outer formation material.

The metal foil according to the exemplary embodiment of the present invention may be an aluminum foil of a thin film made of an aluminum material.

In the exemplary embodiment of the present invention, in attaching the metal foil on the surface of the predetermined 3D structure, the metal foil may be sequentially pressed so as not to allow air to be introduced into an interfacial space.

In the exemplary embodiment of the present invention, the predetermined 3D structure may be electropolished in an electrolyte solution to planarize the surface of the predetermined 3D structure.

In the exemplary embodiment of the present invention, while anodizing, the metal foil base may be immersed in an anodizing device filled with the electrolyte solution and then electrodes are applied to the metal foil base to form an anodized layer having the nano-scale holes.

In the exemplary embodiment of the present invention, in coating the polymer material, the polymer material may be injected into the nano-scale holes of the metal base material, so that the negative replica structure includes a plurality of pillars corresponding to the nano-scale holes.

In the exemplary embodiment of the present invention, the polymer solution may be one material selected from the group consisting of a PTFE (polytetrafluoroethylene), an FEP (fluorinated ethylene propylene) copolymer, and a PFA (perfluoroalkoxy).

In the exemplary embodiment of the present invention, the metal foil base may be removed through chemical etching.

ADVANTAGEOUS EFFECTS

As described above, the method for fabricating the 3D structure according to the exemplary embodiment of the present invention has such an advantage that because the hydrophobicity can be provided to the inner surface of the 3D structure without using high-priced equipment such as in the related art MEMS process, the fabrication costs can be reduced and the process can be simplified.

BRIEF DESCRIPTION OF DRAWINGS

FIG. 1 is a flow chart illustrating the process of a method for fabricating a 3D structure having a hydrophobic surface according to a first exemplary embodiment of the present invention.

FIG. 2 is a schematic diagram showing a predetermined structure in one of steps of imaging the 3D structure having the hydrophobic surface in FIG. 1.

FIG. 3 is a schematic diagram showing a state in which a metal foil is attached on the predetermined structure in FIG. 2.

FIG. 4 is a schematic diagram showing a state in which an anodized layer is formed on the surface of the metal foil base in FIG. 3.

FIG. 5 is a schematic diagram showing a state in which a negative replica structure is formed corresponding to the surface of the metal foil base in FIG. 4.

FIG. 6 is a schematic diagram showing a state in which an outer formation material is attached on an outer surface of the negative replica structure in FIG. 5.

FIG. 7 is a schematic diagram showing a state in which the metal foil base and the anodized layer in FIG. 6 are removed to leave the negative replica structure and the outer formation material.

FIG. 8 is a schematic diagram showing covering of the predetermined structure with the metal foil in FIG. 2.

FIG. 9 is a schematic diagram showing an anodizing device for anodizing the metal foil base in FIG. 4.

FIG. 10 is an enlarged view showing nano-scale holes formed on the anodized layer after anodizing the metal foil base in FIG. 9.

FIG. 11 is a schematic diagram showing a negative replication device for replicating the negative replica shape corresponding to the nano-scale holes of the anodized layer in FIG. 5.

FIG. 12 is a cross-sectional view of the negative replication device taken along line XII-XII in FIG. 11.

FIG. 13 shows photographs taken before (a) and after (b) anodizing the metal foil according to the first embodiment of the present invention.

FIG. 14 shows a photograph of an enlarged surface of the metal foil in FIG. 13.

FIG. 15 shows a photograph of experimentation of a contact angle of a liquid after negative replicating the surface of the metal foil in FIG. 14.

MODE FOR THE INVENTION

The exemplary embodiments of the present invention will now be described in detail with reference to the accompanying drawings such that a skilled person in the art can easily perform the present invention. As those skilled in the art would realize, the described embodiments may be modified in various different ways, all without departing from the spirit or scope of the present invention.

In the present invention, "micro-scale" is defined as a size in the range equal to or more than 1 μm and less than 1000 μm, and "nano-scale" is defined as a size in the range equal to or more than 1 nm and less than 1000 nm.

FIG. 1 is a flow chart of a method for fabricating a 3D structure having a hydrophobic surface according to a first exemplary embodiment of the present invention.

As shown in FIG. 1, a method for fabricating a 3D (three-dimensional) structure having a hydrophobic surface according to an exemplary embodiment of the present invention includes a step of preparing a metal foil base S1, a step of anodizing the metal foil base S2, a step of coating a polymer material S3, a step of forming an outer structure S4, and a step of removing the metal foil base S5. By performing such steps, a structure having a hydrophobic surface can be fabricated in a simple manner at a low cost according to the exemplary embodiment of the present invention, compared with the related art MEMS (Micro Electro Mechanical Systems) process. In addition, the 3D structure can be fabricated such that its inner and outer surfaces are provided with hydrophobicity according to the fabrication steps.

FIGS. 2 to 7 are schematic diagrams sequentially showing a fabrication process of the method for fabricating the 3D structure having a hydrophobic surface in FIG. 1. FIG. 2 is a schematic diagram showing a predetermined-shaped structure.

As shown in FIG. 2, a predetermined-shaped structure 101 according to the exemplary embodiment of the present invention is a cylindrical object to be used for providing hydrophobicity to an inner surface of a pipe structure. In the exemplary embodiment of the present invention, the predetermined-shaped structure 101 is immersed in a solution obtained by mixing perchloric acid and ethanol in a 1:4 volume ratio and then electropolishing to planarize the predetermined-shaped structure 101.

FIG. 8 is a schematic diagram showing covering the predetermined-shaped structure with the metal foil in FIG. 2.

As shown in FIGS. 1, 2B, and 3, in the exemplary embodiment of the present invention, the step of preparing the metal foil is performed to attach the metal foil 110 to the surface of the predetermined-shaped structure 101 (S1). In the exemplary embodiment of the present invention, the structure with the metal foil 110 attached on the surface of the predetermined-shaped structure 101 will be designated as a "metal foil base." In the step of preparing metal foil S1, aluminum foil that is commonly used in daily life is employed as the metal foil 110. The aluminum foil is a product of a thin film fabricated with an aluminum material. In the step of preparing metal foil S1, the metal foil 110 is successively pressed so that air can be eliminated between the metal foil 110 and the predetermined-shaped structure 101 in the process of attaching the metal foil 110 to the predetermined-shaped structure 101.

FIG. 9 is a schematic diagram showing an anodizing device for anodizing the metal foil base in FIG. 4.

As shown in FIGS. 1, 2C, and 4, in the exemplary embodiment of the present invention, the step of anodizing is performed to anodize the metal foil base to form nano-scale holes on the outer surfaces of the metal foil base (S2). In the step of anodizing, the metal foil base is immersed in an electrolyte solution 23, and electrodes are then applied thereto to form an anodized layer 120 on the surface of the metal foil base.

For this purpose, an anodizing device 20 as shown in FIG. 9 is used in the exemplary embodiment of the present invention. In the anodizing device 20, a certain amount of the electrolyte solution 23 (e.g., 0.3M oxalic acid $C_2H_2O_4$, or phosphoric acid) is filled in an internal receiving space of a main body 21 for anodizing, in which the metal foil base is immersed. The anodizing device 20 includes a power supply unit 25 and the metal foil base is connected to one of an anode and a cathode of the power supply unit 25, and a different metal substrate 26 of platinum is connected to the other remaining terminal of the power supply unit 25. Here, the different metal substrate 26 can be any material so long as it is a conductor that is available for power application. Under experimental conditions, the power supply unit 25 applies a pre-set constant voltage (e.g., 60V) to the metal foil base, and the different metal substrate 26 is maintained at a preset distance (e.g., 50 mm) therefrom. In this case, the electrolyte solution 23, which is maintained at a certain temperature (e.g., 15° C.), is stirred by a stirrer to prevent a local deviation of solution density. Then, alumina is formed as the anodized layer 120 on the surface of the metal foil base. After the anodizing is performed, the metal foil base is taken out of the electrolyte solution 23, washed with deionized water (e.g., for about 15 minutes), and then dried in an oven at a pre-set temperature (e.g., 60° C.) for a certain time period (e.g., about one hour).

Then, nano-scale holes 121 having a nano-meter unit diameter as shown in FIG. 10 are formed on the anodized layer 120 of the metal foil base.

Meanwhile, before the step of anodizing, micro-scale protrusions and depressions may be shaped on a surface of the metal foil base by colliding fine particles against the surface using a particle sprayer. Afterward, the metal foil base is anodized, such that the metal foil base is configured as a structure having both the micro-scale protrusions and depressions and the nano-scale holes on its surface.

FIG. 11 is a schematic diagram showing a negative replication device for replicating the negative replica shape corresponding to the nano-scale holes of the anodized layer in FIG. 5, and FIG. 12 is a cross-sectional view of the negative replication device taken along line XII-XII in FIG. 11.

As shown in FIGS. 1, 5, 6, and 7, in the exemplary embodiment of the present invention, a polymer material is coated on the anodized layer 120 corresponding to the outer surface of the metal foil base. Then, the polymer material is formed as a negative replica structure 130 corresponding to the nano-scale holes 121 of the anodized layer 120. Namely, in the exemplary embodiment of the present invention, the step of coating the polymer material S3 is performed to form the negative replica structure 130 on the surface of the metal foil base.

In the exemplary embodiment of the present invention, the metal foil base having the nano-scale holes 121 is provided as a replication template, and a negative replication device 30 as shown in FIGS. 6 and 7 is used to perform the step of anodizing S2. The negative replication device 30 includes a device body 31, a receiving part 32 having a certain receiving space in the device body 31, a polymer solution 33 received in the receiving part 32, and a cooling unit 34 provided along the side of the device body 31 and coagulating the polymer solution 33 within the receiving part 32 so as to be solidified.

In the negative replication device 30, the metal foil base is immersed as the replication template in the polymer solution 33, and a polymer material is coated on the anodized layer 120 of the metal foil base. That is, the polymer solution 33 is injected into the nano-scale holes 121 of the anodized layer 120, and as the cooling unit 34 of the negative replication device 30 operates, the polymer material contacting the metal foil base is solidified. In this manner, in the exemplary embodiment of the present invention, the negative replica structure 130 having the negative shape surface corresponding to the shape of the nano-scale holes 121 is formed by coating the polymer material on the outer surface of the anodized layer 120. That is, because the negative replica structure 130 is the negative shape surface corresponding to the nano-scale holes 121, it includes a plurality of pillars corresponding to the respective nano-scale holes 121.

The polymer solution 33 is made of one material selected from the group consisting of a PTFE (polytetrafluoroethylene), an FEP (fluorinated ethylene propylene) copolymer, and a PFA (perfluoroalkoxy).

Meanwhile, when both of the micro-scale protrusions and depressions and the nano-scale holes are formed on the surface of the metal foil base, the negative replica structure may also has micro-scale protrusions and depressions and nano-scale pillars at the same time on its surface. Accordingly, the negative replica structure has a super-hydrophobic surface of dual-scale.

Next, in the exemplary embodiment of the present invention, as shown in FIG. 6, the step of forming an outer structure S4 is performed to cover the outer surface of the negative replica structure 130 with an outer formation material 140. The outer formation material 140 is a material with a particular viscosity and flexibility so as to be attached on the uneven outer surface of the negative replica structure 130. In particular, the exemplary embodiment of the present invention exemplarily shows the method for fabricating a pipe structure having a hydrophobic inner surface, so the circumferential surface of the cylindrical metal foil base is covered with an acrylic film to be used as a pipe material. As the outer formation material 140, various materials other than the acrylic film may be used.

Thereafter, in the exemplary embodiment of the present invention, the metal foil base with the anodized layer 120 formed thereon is removed from the negative replica structure 130 and the outer formation material 140 (S5). In this case, the predetermined-shaped structure 101 of the metal foil base can be easily separated from the metal foil 110, so it is separated and removed in a mechanical manner such as by extrusion. After the predetermined-shaped structure 101 is removed, the metal foil 110 and the anodized layer 120 are removed through wet etching.

By performing such steps in the exemplary embodiment of the present invention, the negative replica structure 130 and the outer formation material 140 remain as shown in FIG. 7. As mentioned above, with the plurality of nano-scale pillars formed on the inner surface, the negative replica structure 130 finally obtains the hydrophobic surface of a nano-scale. That is, because the negative replica structure 130 has such a sectional structure of the internal surface as that of a lotus leaf, it has the hydrophobic surface characteristics with minimized wetting properties, and accordingly, a contact angle between the negative replica structure 130 and a liquid thereon can be drastically increased to more than 160°.

EXPERIMENTAL EXAMPLE

The hydrophobicity of the 3D structure fabricated according to the exemplary embodiment of the present invention will be described hereinafter.

As the metal foil, a foil made of an aluminum material was employed. The aluminum foil had a thickness of 27 μm and a size of 3.5 cm×5 cm. The aluminum foil was attached to the predetermined-shaped structure so as to be formed as the metal foil base. The thusly formed metal foil base was anodized in the 0.3M oxalic acid solution for thirteen hours.

The aluminum foil was visually discriminated clearly before the anodizing was performed as in the photograph shown in (a) of FIG. 13, and after the anodizing was performed as in the photograph shown in (b) of FIG. 13. FIG. 14 shows a photograph of an enlarged surface of the metal foil in FIG. 13, in which it is noted that the nano-scale holes are formed in the aluminum foil.

Thereafter, the anodized aluminum foil was coated with the polymer material to form the negative replica structure, and then the outer formation material was attached thereon. Then, the contact angle with the liquid on the surface of the negative replica structure was measured through experimentation, which notably shows the results that the contact angle with the liquid was drastically increased to more than 160° as shown in FIG. 15.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The invention claimed is:

1. A method for fabricating a 3D (three-dimensional) structure, the method comprising:
    preparing a metal foil base by attaching a metal foil on an outer surface of a predetermined-shaped 3D structure;
    anodizing the metal foil base to form nano-scale holes on an outer surface of the metal foil base;
    coating a polymer material on the outer surface of the metal foil base to form the polymer material as a negative replica structure corresponding to the nano-scale holes of the metal foil base;
    forming an outer structure by covering an outer surface of the negative replica structure with an outer formation material; and
    removing the metal foil base from the negative replica structure and the outer formation material,
    wherein in attaching the metal foil on the surface of the predetermined-shaped 3D structure, the metal foil is sequentially pressed so as to not allow air to be introduced into an interfacial space.

2. The method of claim 1, wherein the metal foil is an aluminum foil of a thin film made of an aluminum material.

3. The method of claim 1, wherein the predetermined shaped 3D structure is electropolished in an electrolyte solution to planarize the surface of the predetermined shaped 3D structure.

4. The method of claim 1, wherein, while anodizing, the metal foil base is immersed in an anodizing device filled with an electrolyte solution and then electrodes are applied to the metal foil base to form an anodized layer having the nano-scale holes.

5. The method of claim 1, wherein, while coating the polymer material, the polymer material may be injected into the nano-scale holes of the metal foil base, so that the negative replica structure comprises a plurality of pillars corresponding to the nano-scale holes.

6. The method of claim 3, wherein the polymer material is one material selected from the group consisting of a PTFE (polytetrafluoroethylene), an FEP (fluorinated ethylene propylene) copolymer, and a PFA (perfluoroalkoxy).

7. The method of claim 1, wherein the metal foil base is removed through chemical etching.

* * * * *